United States Patent
Wang et al.

(10) Patent No.: US 8,175,465 B2
(45) Date of Patent: May 8, 2012

(54) BIAS CONTROL APPARATUS AND METHOD FOR OPTICAL MODULATOR

(75) Inventors: Leah Wang, Sunnyvale, CA (US); Anthony C. Kowalczyk, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 236 days.

(21) Appl. No.: 12/616,072

(22) Filed: Nov. 10, 2009

(65) Prior Publication Data
US 2010/0119239 A1   May 13, 2010

Related U.S. Application Data

(60) Provisional application No. 61/113,959, filed on Nov. 12, 2008.

(51) Int. Cl.
*H04B 10/04* (2006.01)
(52) U.S. Cl. ........ 398/168; 398/183; 398/192; 398/194; 398/195; 359/245; 359/239; 359/276; 359/278; 385/1; 385/2; 385/3
(58) Field of Classification Search ............ 398/183, 398/198, 195, 196, 197, 186, 193, 192, 200, 398/201, 194, 158, 159, 187; 359/245, 237, 359/238, 248, 276, 278, 247, 239, 279, 249; 385/1, 2, 3
See application file for complete search history.

(56) References Cited

U.S. PATENT DOCUMENTS

| | | | |
|---|---|---|---|
| 6,317,247 | B1 | 11/2001 | Yang et al. |
| 7,092,643 | B2 * | 8/2006 | Kajiya et al. ............... 398/198 |
| 2006/0127103 | A1 * | 6/2006 | Mazurczyk et al. ......... 398/188 |
| 2008/0094123 | A1 | 4/2008 | Koh et al. |
| 2009/0003840 | A1 | 1/2009 | Nahapetian et al. |

OTHER PUBLICATIONS

"Application Note Modulator Bias Controllers," (2004) pp. 1-14, PHOTONICSystems, Inc., Billerica, MA.
Betts, "Linearized Modulator for Suboctave-Bandpass Optical Analog Links," IEEE Transactions on Microwave Theory and Techniques, Dec. 1994, pp. 2642-2649, vol. 42, No. 12, IEEE.

* cited by examiner

*Primary Examiner* — Hanh Phan
(74) *Attorney, Agent, or Firm* — McDermott Will & Emery LLP

(57) ABSTRACT

Examples of apparatus and methods are provided for controlling a bias in an optical modulator. An exemplary apparatus may comprise an optical modulator operable to modulate an optical signal. The optical modulation apparatus may comprise a photodetector disposed to receive at least a portion of the modulated optical signal. The optical modulation apparatus may comprise a bias controller coupled to both the optical modulator and the photodetector. The bias controller may be configured to receive a dither signal and to produce a bias feedback signal for the optical modulator. The bias feedback signal may be based on a ratio between an odd order harmonic signal of the modulated optical signal and an even order harmonic signal of the modulated optical signal.

20 Claims, 7 Drawing Sheets

BIAS CONTROL APPARATUS AND METHOD FOR OPTICAL MODULATOR

CROSS-REFERENCES TO RELATED APPLICATIONS

The present application claims the benefit of priority under 35 U.S.C. §119 from U.S. Provisional Patent Application Ser. No. 61/113,959, entitled "VERSATILE BIAS CONTROL FOR ANY POINT LOCKING IN LITHIUM NIOBATE BASED MACH-ZEHNDER MODULATORS," filed on Nov. 12, 2008, which is hereby incorporated by reference in its entirety for all purposes.

FIELD

An aspect of the present disclosure may relate to the field of optical modulation, and more particularly, to a bias control apparatus and method for optical modulator.

BACKGROUND

Optical modulators may operate at a bias point based on a direct current (DC) bias signal driving the modulator at a certain voltage level. An operating parameter of an optical modulator such as the bias point may, however, drift over time due to environmental perturbations and aging effects on the modulator. Such a drift in an operating parameter may lead to impaired performance from the optical modulator. Thus, precision bias control of an optical modulator may be of significant utility in commercial and non-commercial applications relying on modulation of optical signals.

SUMMARY

In one aspect of the disclosure, an optical modulation apparatus is provided. The optical modulation apparatus may comprise an optical modulator operable to modulate an optical signal. The optical modulation apparatus may comprise a photodetector disposed to receive at least a portion of the modulated optical signal. The optical modulation apparatus may comprise a bias controller coupled to both the optical modulator and the photodetector. The bias controller may be configured to receive a dither signal and to produce a bias feedback signal for the optical modulator. The bias feedback signal may be based on a ratio between an odd order harmonic signal of the modulated optical signal and an even order harmonic signal of the modulated optical signal.

In a further aspect of the disclosure, a bias controller apparatus is provided for an optical modulator. The bias controller apparatus may comprise a filter module configured to receive an electrical signal of a modulated optical signal from an optical modulator. The filter module may be configured to produce a 1st order fundamental signal of the modulated optical signal. The filter module may be configured to produce a 2nd order harmonic signal of the modulated optical signal. The bias controller apparatus may comprise a controller module configured to produce a ratio based on the 1st order fundamental signal and the 2nd order harmonic signal. The controller module may be configured to compare the ratio to a predetermined ratio. The controller module may be configured to produce a bias control value based on the comparison of the ratio and the predetermined ratio. The bias controller apparatus may comprise a bias supply module configured to receive a dither signal and the bias control value and to produce a bias signal for the optical modulator based on the dither signal and the bias control value.

In yet a further aspect of the disclosure, a method of controlling a bias of an optical modulator is provided. The method may comprise receiving an electrical signal converted from a modulated optical signal of an optical modulator. The modulated optical signal may be based on a bias signal with a dither signal. The method may comprise providing an odd order harmonic signal of the modulated optical signal. The method may comprise providing an even order harmonic signal of the modulated optical signal. The method may comprise producing a ratio of the odd order harmonic signal and the even order harmonic signal. The method may comprise comparing the ratio to a predetermined ratio. The method may comprise producing a bias control value based on the comparison of the ratio and the predetermined ratio. The method may comprise producing a second bias signal for the optical modulator based on the bias control value.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
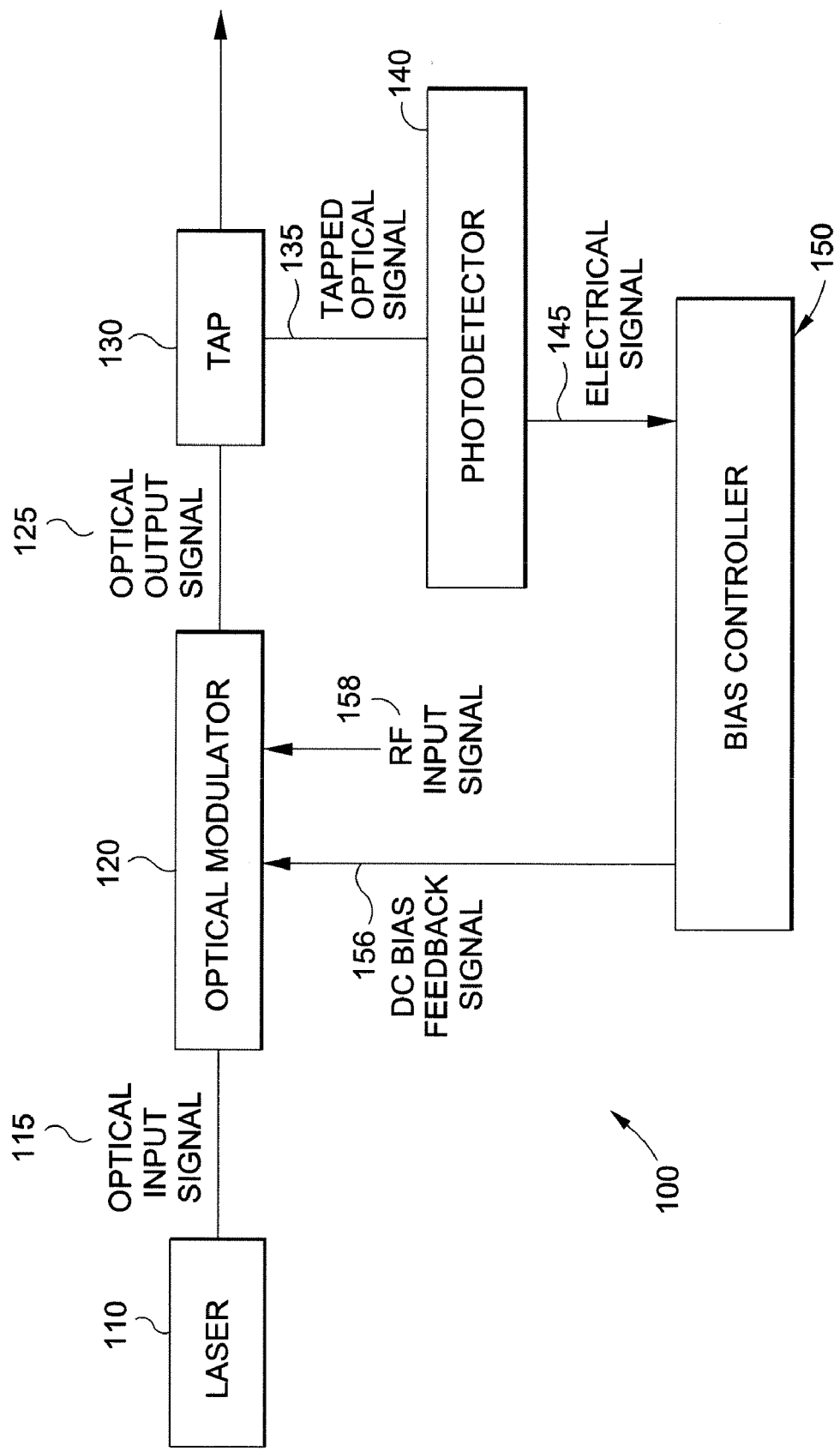
FIG. 1 is a conceptual block diagram illustrating an example of an optical modulation apparatus.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

The bias point in optical modulators has been known to drift over time due to environmental perturbations and aging effects. Precision bias control can become significant for applications where amplitude or phase information from an optical modulator is used. Some common operating bias points in an optical modulator may include a negative sloped quadrature, a positive sloped quadrature, a minimum (also called null), and a maximum (also called a peak). For some applications, biasing at any arbitrary point along the transfer function curve of an optical modulator rather than those above mentioned common biasing points may be necessary. Some current bias controllers may not be able to provide reliable bias control at any arbitrary biasing point. According to aspects of the following disclosure, an apparatus and method are described for a bias controller that can bias an optical modulator with improved stability at any biasing point along a transfer function curve.

Various techniques may be utilized to provide bias control of an optical modulator. For example, one approach employs the ratio determined from the optical output power of the optical modulator to the optical input power of the optical modulator as a feedback parameter. Optical input/output power may be dependent on optical power fluctuations, optical path variations, and optical tap splitting ratios.

Another approach may utilize a low frequency dither tone to evaluate either the lowest order harmonic term or fundamental signal to lock at a quadrature, null or peak of a signal. Since the second order terms may vanish at quadrature, the approach may adjust the bias to minimize the harmonic signal. Output power may be defined at the null or the peak so that the approach may seek to minimize the fundamental 1st order signal. Thus, output power may not be defined at points other than the null or the peak. At null, the output power from an optical modulator may be very low; consequently, the fundamental or harmonic signals may be very weak as well. In order to minimize fundamental signal, a photodetector receiving an output signal from the optical modulator may need to have a very high sensitivity to low noise ratio and linear response.

The approaches described above have various drawbacks, and it can be seen that a need may exist for an improved bias control apparatus and method for driving a bias signal at an arbitrary operating point.

An aspect of the subject technology generally relates to implementation of precise bias control at any arbitrary phase biasing point along a transfer function curve associated with the operation of an optical modulator. Versatility in controlling the bias applied to an optical modulator may be performed by including the use of first and second order signals generated from an optical modulator and more particularly, by employing the ratio of the first and second order signals to adjust a DC bias applied to the optical modulator. One example of an optical modulator that may benefit from the descriptions herein may be a Mach-Zehnder modulator (MZM). In one advantageous example, an MZM may be a lithium niobate (LN) based MZM. Lithium niobate based MZMs may be widely used in digital and analog communication industries. Precise and reliable bias control may be a significant aspect of communication applications. A ratio based technique in one aspect of the subject disclosure, may overcome photodetector noise and provide sensitive and reliable feedback.

The terms "first," "second," "first order" and "second order" may be sometimes referred to as 1st, 2nd, 1st order and 2nd order, respectively. The term "optical modulator" may be sometimes referred to as a modulator, an electro-optic modulator or an optoelectronic modulator.

Referring now to the illustrations, and more particularly to FIG. 1, an example of an optical modulation apparatus 100 according to one aspect of the subject technology is shown. In general, an optical modulation apparatus 100 may include an optical modulator 120 and a bias controller 150. The optical modulation apparatus, may in an exemplary embodiment, also include a laser 110, a tap 130, and a photodetector 140. The photodetector 140 may include a photodiode and/or other light sensors. The tap 130 may be an optical tap such as a fiber tap or optical power splitter.

In one exemplary embodiment, the laser 110 may generate and provide an optical input signal 115 to the optical modulator 120. The optical modulator 120 may be biased to operate at a predetermined operating set-point. The predetermined operating set-point value may be based on an initial power ratio set during initial operation of the optical modulator 120. According to one aspect of the disclosure, the DC bias applied to the optical modulator 120 may be iteratively adjusted to maintain an approximately same operating state over time. The optical modulator 120 may modulate the optical input signal 115 with a radio frequency (RF) input signal 158. In one example, an RF input signal 158 may include data (e.g., audio, video, multimedia, text, or other data), control (e.g., control information associated with data such as the time, location and/or method for displaying the data) and/or a combination. The optical modulator 120 may generate, accordingly, an optical output signal 125 from which the tap 130 may transmit at least a portion of the modulated optical output signal 125 as a tapped optical signal 135 to the photodetector 140. The photodetector 140 may convert the tapped optical signal 135 into an electrical signal 145. The electrical signal 145 may be received by the bias controller 150. The bias controller 150 may use 1st and 2nd order signals associated with the electrical signal 145 with respect to a dithering frequency detected to produce a DC bias feedback signal 156. The DC bias feedback signal 156 may be transmitted to the optical modulator 120 at an adjusted DC bias level. More details describing aspects of the bias controller 150 are provided throughout the following disclosure.

Figure 2:
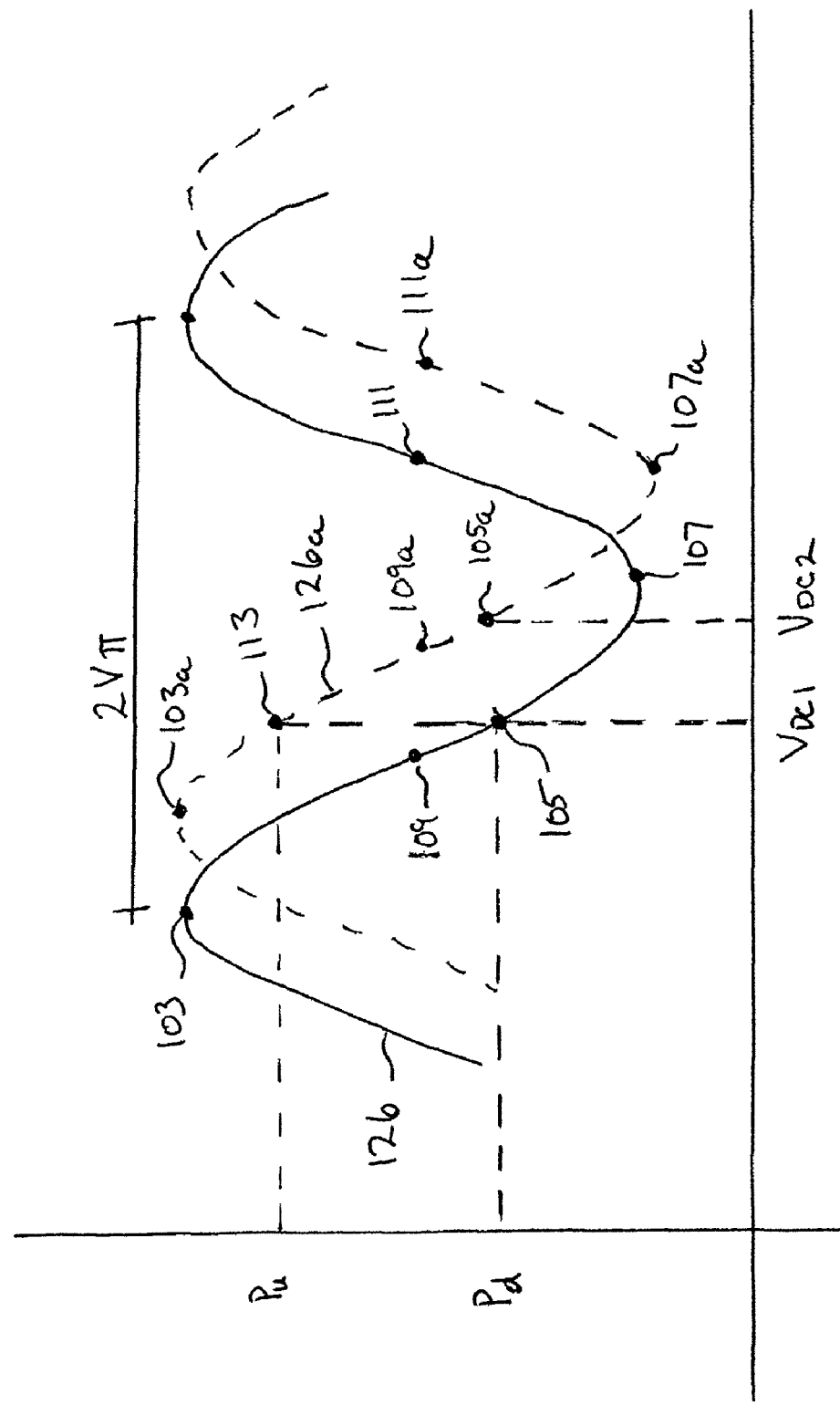
FIG. 2 is a diagram illustrating an example of an optical output signal and operational drift without bias control implementation.

FIG. 2 illustrates exemplary transfer functions of an optical modulator 120. Transfer function curves 126 and 126a illustrate a drift in a bias point 105 of an optical modulator. Transfer function curve 126 may represent characteristics of the optical modulation apparatus 100 at time T1. Transfer function curve 126a may represent characteristics of the optical modulation apparatus 100 at time T2. With concurrent reference to FIGS. 1 and 2, the vertical axis of the transfer function curves may represent absolute or relative output power of an optical modulator 120. In one example, the vertical axis may represent an optical output signal 125 or a ratio between an optical output signal 125 and an optical input signal 115. In one aspect, the horizontal axis of the transfer function curves may represent a DC bias voltage applied to an optical modulator (e.g., a DC bias voltage applied by a bias controller 150 to a modulator 120). In another aspect, the horizontal axis may represent a DC bias phase. In one aspect, there is a one-to-one correspondence between the DC bias voltage and DC bias phase. The term "DC bias voltage" or "bias voltage" may be sometimes referred to as DC bias phase, DC phase bias, bias phase, DC bias, DC phase bias angle, DC bias phase angle, phase angle or vice versa. In the exemplary depiction shown, the transfer function curve 126 depicts $2V_\pi$, and $V_\pi$ may be a bias voltage difference between a peak and a null of a transfer function curve. A position of the transfer function curve 126 may be controlled by a DC bias voltage via the DC bias feedback signal 156. Exemplary influences such as environmental perturbations and aging effects may contribute to drift in bias point. Over time a desired bias point (at time T1) may drift to an undesired bias point (at time T2). For example, an optical modulator 120 may be initially (at time T1) set to operate at a bias point 105 having a desired output power $P_d$ and a bias voltage $V_{DC1}$. Over time the bias voltage required to produce the desired output power $P_d$ may change from $V_{DC1}$ (at time T1) to $V_{DC2}$ (at time T2). Thus, if the bias voltage is maintained at $V_{DC1}$ rather than being changed to $V_{DC2}$ at time T2, then the output power at time T2 may be at an undesired power level $P_u$ at point 113.

In one aspect of the disclosure, an operating bias point 105 can be arbitrary in that a desired bias point can be set anywhere along a transfer function curve and is not limited to a peak 103, a null 107, a negative sloped quadrature 109, or a positive sloped quadrature 111. In one aspect, an operating bias point 105 may be chosen to be any point along a transfer function curve 126 of an optical modulator that is not a peak 103, a null 107, or a quadrature point 109 or 111.

In one aspect, the DC bias voltage may be iteratively adjusted to compensate for this drift and to provide precise bias control of the optical modulator over time. According to aspects of the subject technology, improved bias control may be achieved by employing a comparison of a ratio determined at time T2 to a predetermined desired ratio determined at time T1.

One approach to controlling the DC bias applied to an optical modulator 120, according to aspects of the subject technology, may include using a ratio of the 2nd order harmonic signal to the 1st order fundamental signal from the optical output signal 125 of the optical modulator 120 as a feedback parameter when a low frequency dithering tone is applied to the DC bias. This ratio may be independent of the optical modulator 120 input power level and may be a well-defined monotonic curve along the transfer function curve 126. Biasing at any arbitrary operating point can be achieved reliably and precisely by feedback control at the corresponding set-point for this ratio. The term "dithering tone" may be sometimes referred to as "dither tone," "dither signal," "dithering signal," "dither tone signal," or a similar term.

In one aspect, at time T1, a dither signal may be applied and a DC bias may be adjusted until a desired output power is achieved. A desired ratio of the 1st order fundamental signal and the 2nd order harmonic signal may be determined that produces the desired output power $P_d$. At time T1, the DC bias voltage and the desired ratio may, thus, be determined for the desired output power.

The following derivations may be useful in describing aspects of the subject technology. For an optical modulator 120, the output optical power $P_o$ in terms of input optical power $P_{in}$ may be represented as:

$$P_0 = \frac{T_D P_{in}}{2}(1 + \cos[\phi_0 + \Delta\phi]), \quad (1)$$

where $\phi_0$ may be the DC phase bias (90° for quadrature), $T_D$ may be the transmission coefficient of the optical modulator 120 when biased for maximum transmission which accounts for the intrinsic insertion loss through the device, and $\Delta\phi$ is the phase shift due to application of a dither signal (e.g., an AC signal). For an input sinusoidal signal at angular frequency $\omega$, $\Delta\phi$ may be given by:

$$\Delta\phi = \frac{\pi V}{V\pi(\omega)}\sin(\omega t + \theta(\omega)), \quad (2)$$

where V may be the amplitude of the input dither signal (e.g., an AC signal), $V\pi(\omega)$ or $V\pi$ is the RF half-wave voltage of the modulator (sometimes referred to as $V_{pi}$), $\theta(\omega)$ is the phase response representative of the delay in the modulated signal due to microwave-optical velocity mismatch. By substituting equation (2) into (1), the resultant may be:

$$P_0 = \frac{T_D P_{in}}{2}\left(1 + \cos\left[\phi_0 + \frac{\pi V}{V\pi(\omega)}\sin(\omega t + \theta(\omega))\right]\right). \quad (3)$$

Setting $$a = \frac{\pi V}{V\pi(\omega)}$$

and applying trigonometric and Taylor series expansions to the 4th order to equation (3), the resultant may be:

$$P_0 = \frac{T_D P_{in}}{2}(1 + \cos\phi_0 \cdot \cos(a\sin(\omega t + \theta(\omega))) - \sin\phi_0 \cdot \sin(a\sin(\omega t + \theta(\omega))))$$

$$= \frac{T_D P_{in}}{2}\left(1 + \cos\phi_0\left(1 - \frac{a^2\sin^2(\omega t + \theta(\omega))}{2} + \frac{a^4\sin^4(\omega t + \theta(\omega))}{24}\right) - \sin\phi_0\left(a\sin(\omega t + \theta(\omega)) - \frac{a^3\sin^3(\omega t + \theta(\omega))}{6}\right)\right)$$

$$= \frac{T_D P_{in}}{2}\left(1 + \cos\phi_0\left(1 - \frac{a^2}{2}\frac{1 - \cos(2\omega t + 2\theta(\omega))}{2} + \frac{a^4}{24}\frac{1}{4}\left(\frac{3}{2} + \frac{1}{2}\cos(4\omega t + 4\theta(\omega)) - 2\cos(2\omega t + 2\theta(\omega))\right)\right) - \sin\phi_0\left(a\sin(\omega t + \theta(\omega)) - \frac{a^3}{6}\left(\frac{3}{4}\sin(\omega t + \theta(\omega)) - \frac{1}{4}\sin(3\omega t + 3\theta(\omega))\right)\right)\right)$$

$$= \frac{T_D P_{in}}{2}\left(1 + \cos\phi_0\left(1 - \frac{a^2}{4} + \frac{a^4}{64} + \left(\frac{a^2}{4} + \frac{a^4}{48}\right)\cos(2\omega t + 2\theta(\omega)) + \frac{a^4}{92}\cos(4\omega t + 4\theta(\omega))\right) - \sin\phi_0\left(\left(a - \frac{a^3}{8}\right)\cdot\sin(\omega t + \theta(\omega)) + \frac{a^3}{24}\sin(3\omega t + 3\theta(\omega))\right)\right)$$

From the above equation, the output powers at 2nd order and 1st order and ratio r between them may be given by:

$$P_{1st} = \frac{T_D P_{in}\eta}{2}\sin\phi_0\left(\frac{a^3}{8} - a\right);$$

$$P_{2nd} = \frac{T_D P_{in}\eta}{2}\cos\phi_0\left(\frac{a^2}{4} - \frac{a^4}{48}\right);$$

$$r = \frac{P_{2nd}}{P_{1st}} = \frac{\cos\phi_0\left(\frac{a^2}{4} - \frac{a^4}{48}\right)}{\sin\phi_0\left(\frac{a^3}{8} - a\right)} = \cot\phi_0\frac{\left(\frac{a^2}{4} - \frac{a^4}{48}\right)}{\left(\frac{a^3}{8} - a\right)}$$

where η denotes the photodetector responsivity. For a given optical modulator 120 with fixed dithering tone, the ratio of a 2nd order harmonic signal to a 1st order fundamental signal may be independent of the optical input power of the optical modulator 120. However, in one aspect, the 1st and 2nd order signals themselves may depend on the optical input power of the optical modulator 120.

Figure 3:
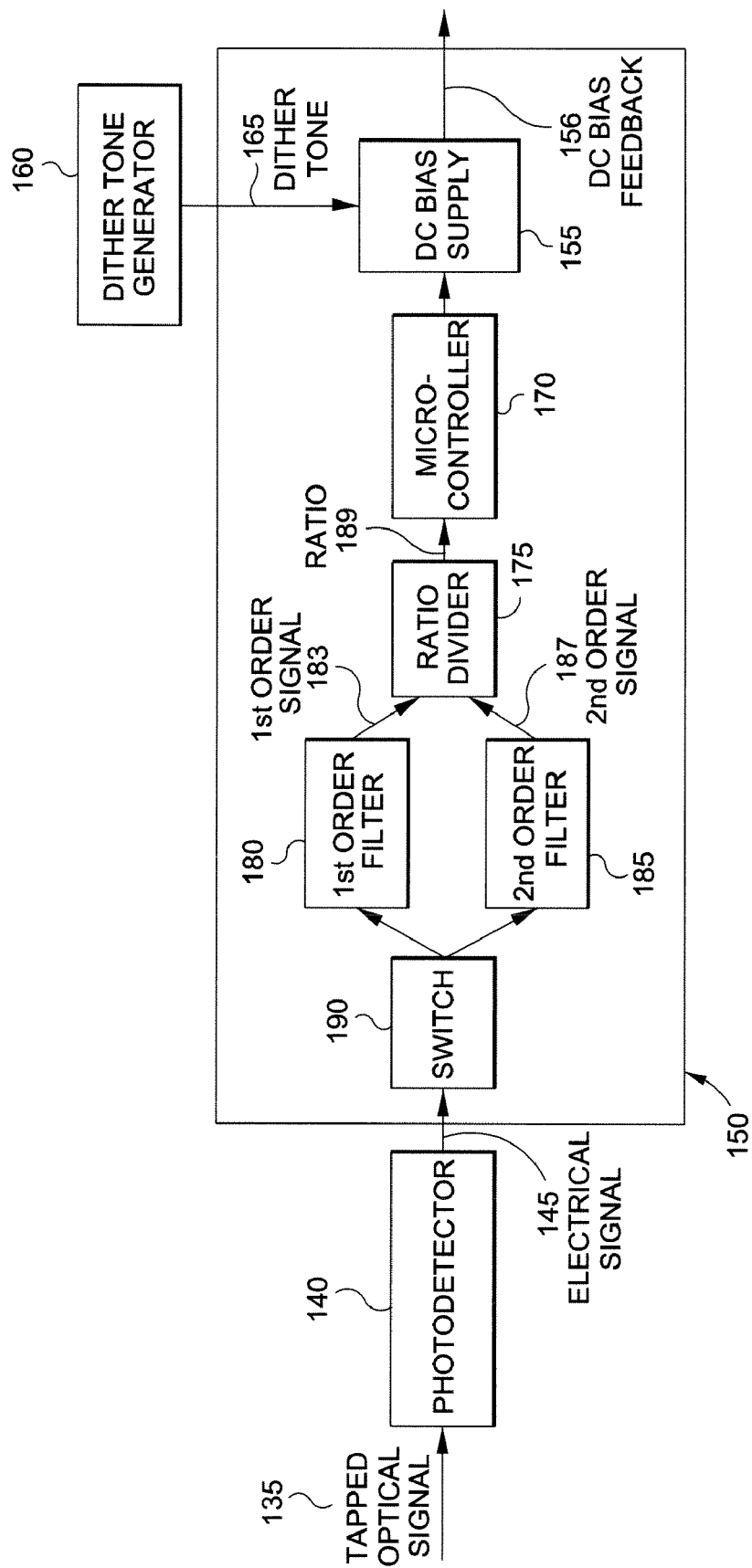
FIG. 3 is a conceptual block diagram illustrating an example of a bias controller that may be employed with the apparatus of FIG. 1.

Referring to FIGS. 1 and 3, an exemplary bias controller 150 adjusting bias control based on a ratio 189 of the 1st order fundamental signal 183 and 2nd order harmonic signal 187 is shown. The bias controller 150 may generally include a 1st order filter 180, a 2nd order filter 185, a DC bias supply 155, and a microcontroller 170. The bias controller 150 may further include a switch 190 and a ratio divider 175. It will be understood that the bias controller 150 may be a collection of the aforementioned elements coupled together or may be an integrated packaged module. In one exemplary embodiment, the microcontroller 170 may be integrated with the ratio divider 175 into a microprocessor.

The switch 190 may be a directional coupler such as an RF coupler directing transmissions of the electrical signal 145 to the 1st order filter 180 and to the 2nd order filter 185. In one aspect, the switch 190 may direct the electrical signal to the 1st order filter 180 and then to the 2nd order filter 185 sequentially, or in reverse order. In another aspect, the switch 190 may serve as a passive splitter and direct the electrical signal to the 1st order filter 180 and the 2nd order filter 185 simultaneously.

Each of the 1st order filter 180 and 2nd order filter 185 may be a bandpass filter, such as a saw filter. In one example, the 1st order filter 180 and 2nd order filter 185 may be disposed in parallel to each other. The 1st order filter 180 may be configured to filter out all harmonics from the electrical signal 145 to produce a 1st order fundamental signal 183. The 2nd order filter 185 may be configured to filter out the 1st order fundamental signal 183 and all other harmonics from the electrical signal 145 to produce a 2nd order harmonic signal 187. The electrical signal 145 is generated from the optical output signal 125 which is generated based on a dither tone 165 from the dither tone generator 160 and the DC bias voltage from the DC bias supply 155. The ratio divider 175 may be configured to receive the 1st order fundamental signal 183 and the 2nd order harmonic signal 187 and determine a ratio 189 (e.g., a power ratio) of the 2nd order harmonic signal 187 to the 1st order fundamental signal 183. In one example, a ratio divider 175 may include an amplifier such as a logarithmic operational amplifier (op amp). The ratio divider function can also be integrated into the microcontroller 170 in digital processing form.

The microcontroller 170 may include memory storing a predetermined ratio for the operating bias point 105 for operation of the optical modulator 120. The microcontroller 170 may also include pre-programmed instructions to compare the power ratio 189 of the current 1st order fundamental signal 183 and the current 2nd order harmonic signal 187 to the previously stored ratio (e.g., a ratio for the bias point 105). In addition, the microcontroller 170 may include instructions for adjusting the DC bias feedback signal 156 produced by the DC bias supply 155.

The DC power supply 155 may be configured to receive a control signal based on the ratio 189. The DC power supply 155 may be configured to supply an adjusted DC bias feedback signal 156 to the optical modulator 120. The DC bias feedback signal 156 may comprise a DC voltage. The DC bias feedback signal 156 may include a bias control adjustment value which comprises a DC bias voltage adjusted based on the comparison of the ratio 189 to the predetermined ratio (e.g., a ratio for the bias point 105). The feedback signal 156 may include the dither tone 165 received from the dither tone generator 160. The dither tone generator 160 may be a crystal oscillator producing an AC signal as the dither tone 165. The dither tone 165 may be of smaller amplitude than the RF input signal 158. For example, the amplitude of the dither tone 165 may be at least 10 times smaller than the amplitude of the RF input signal 158. In one aspect, the amplitude of the dither tone 165 may be much smaller than that of the $V_\pi$ voltage. For example, the amplitude of the dither tone 165 may be at least 10 times smaller than the amplitude of the DC bias voltage.

In one exemplary operation, the 1st order fundamental signal 183 may be generated at approximately the same frequency as the dither signal 165. In one aspect, the 2nd order harmonic signal may, thus, be twice the frequency of the dither tone 165. It will be understood that the dither tone 165 may be much smaller in frequency than the RF input signal 158 to avoid interference effects between the two signals. For example, for an RF input signal 158 of approximately 1 MHz, a dither tone 165 of about 1 KHz may be generated and a 1st order fundamental signal 183 may be produced on the order of approximately 1 KHz. Thus, the 2nd order harmonic signal 187 may be approximately 2 KHz. The bandwidth of the 1st order fundamental signal 183 and the 2nd order harmonic signal 187 may be approximately 0.1 KHz. To further illustrate, a 2 KHz dither tone 165 may produce a 2 KHz 1st order fundamental signal 183 and a 4 KHz 2nd order harmonic signal 187. In one aspect, the frequency of the dither tone 165 may be adjusted depending on the frequency of the RF input signal 158, and may, for example, range into megahertz when the RF input signal 158 also appropriately scales up. In one aspect, the amplitude of the 1st order fundamental signal 183 may be based on the amplitude of a dither signal and the modulator biasing position and may be either smaller or larger than the amplitude of the DC bias voltage. In one aspect, the amplitude of the 2nd order harmonic signal 187 may be based on the amplitude of a dither signal and the modulator biasing position and may be either smaller or larger than the amplitude of the DC bias voltage.

Figure 4:
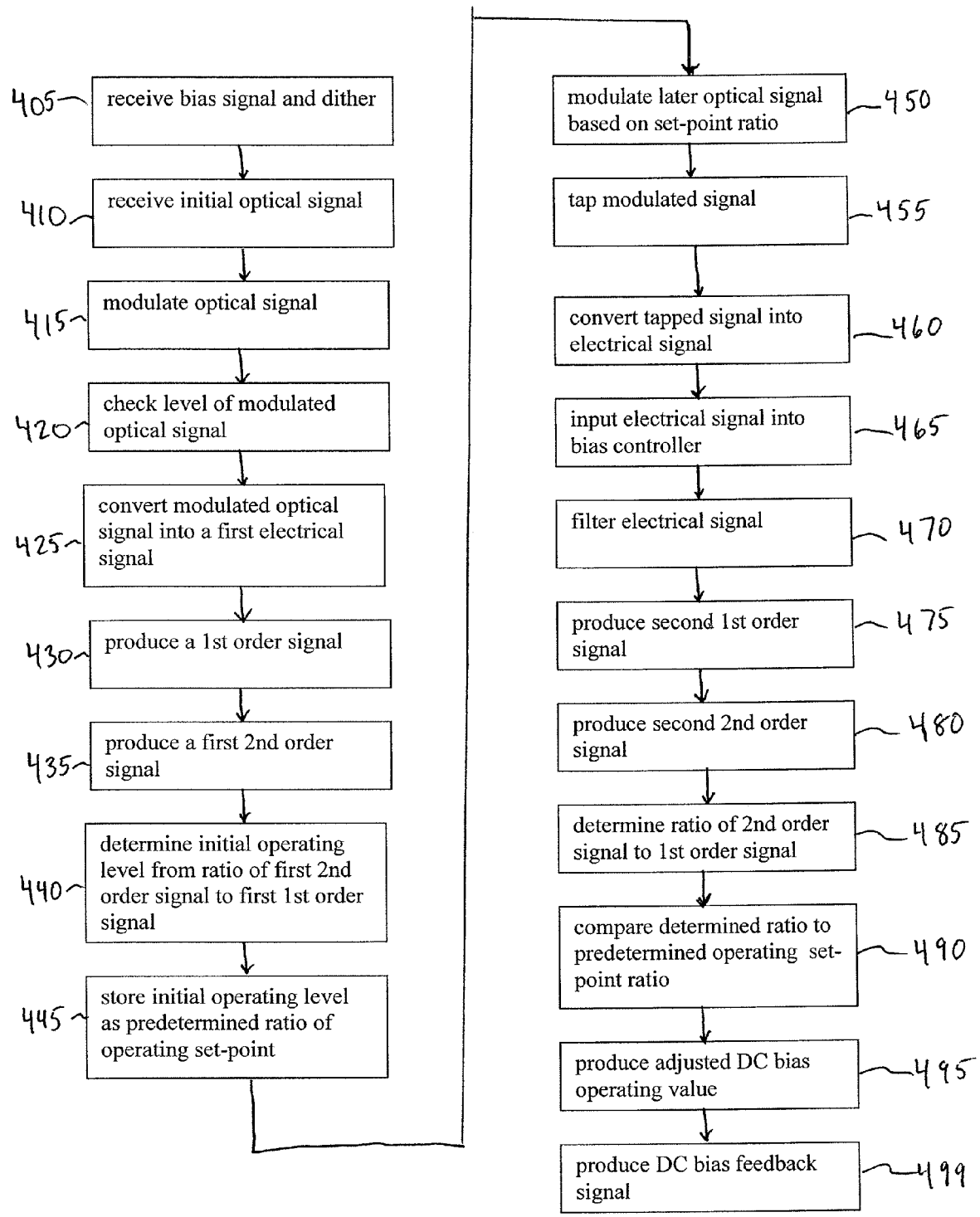
FIG. 4 is a flow chart illustrating an example of an operation of adjusting modulation in the apparatus of FIG. 1.

FIG. 4 illustrates an exemplary method of controlling a bias of an optical modulator. With concurrent reference to FIGS. 1, 3, and 4 the following describes an exemplary aspect of the subject technology. An initial operation of an optical modulator 120 may include operation 405 where an initial bias signal with an initial dither signal may be received by the optical modulator. In operation 410 a first optical signal 115 may be received. In operation 415, the first optical signal 115 may be modulated to produce a first modulated optical output signal 125. In operation 420, a check may be performed as to whether the first modulated optical signal 125 is at a desired level. In operation 425, at least a portion of the first modulated optical signal 125 may be converted into a first electrical signal 145. In operation 430, a first 1st order fundamental signal 183 of the first modulated optical output signal 125 may be filtered out from the electrical signal 145. In operation 435, a first 2nd order harmonic signal 187 of the first modulated optical output signal 125 may be filtered out from the electrical signal 145. In operation 440, an initial operating level may be determined based on a ratio of the first 1st order fundamental signal 183 and the first 2nd order harmonic signal 187. In operation 445, the initial operating level may be stored as a predetermined ratio of an operating bias set-point. In operation 450, a second optical input signal 115 may be received and modulated. In operation 455, at least a portion of the modulated optical output signal 125 may be tapped. In operation 460, the tapped optical output signal 135 may be converted into a second electrical signal 145 by a photodetector 140. The second electrical signal 145 from photodetector 140 may be input to the bias controller 150 for detecting a second 1st order signal and a second 2nd order signal with respect to a dithering tone frequency received from dither tone generator 160 (operation 465). In operation 470, the second electrical signal 145 may be filtered through a band-pass filter (180, 185). In operation 475, the second electrical signal 145 may be filtered to produce a second 1st order fundamental signal 183. In operation 480, the second electrical signal 145 may be filtered to produce a second 2nd order harmonic signal 187. A ratio 189 may be determined by the ratio divider 175 based on the second 1st order fundamental signal 183 and the second 2nd order harmonic signal 187 in operation 485. For example, the ratio may be the second 2nd order harmonic signal 187 divided by the second 1st order fundamental signal 183. In operation 490, the microcontroller 170 may compare the determined ratio 189 to the predetermined ratio for the DC bias operating set-point and may determine if a difference between the two values exists. In operation 495, the microcontroller 170 may produce an adjusted DC bias control value based on the difference between the determined ratio 189 and the predetermined ratio. In operation 499, the microcontroller 170 may control or instruct the DC bias supply 155 to produce a DC bias feedback signal 156 that may include the dithering tone 165 received from the dither tone generator 160 and an adjusted DC bias operating value (e.g., an adjusted DC bias voltage). The method may return to operation 450 and proceed through to operation 499 for iterative adjustment of the DC bias level in the optical modulator.

Figure 5:
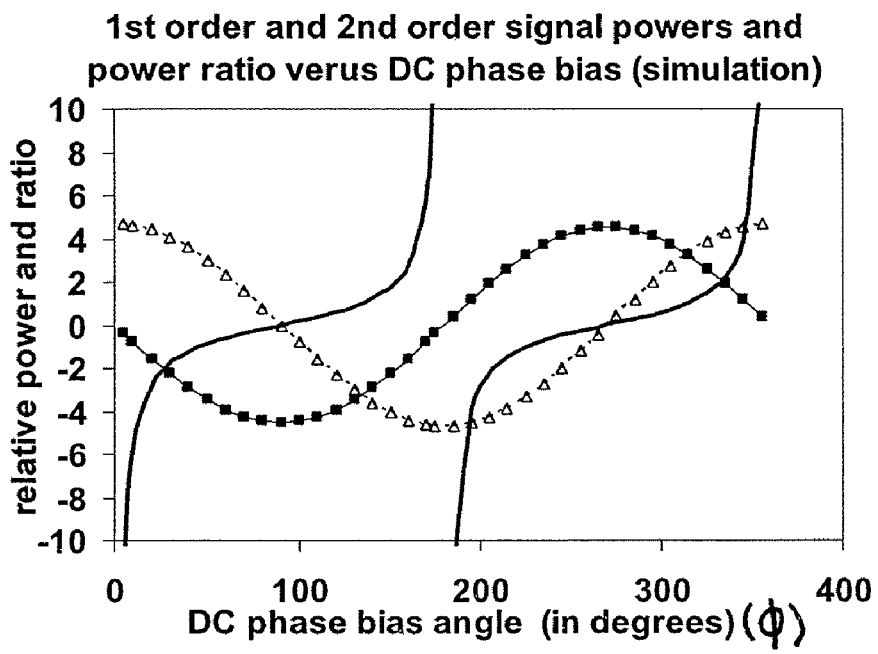
FIG. 5 is an example of a plot illustrating relative power and a power ratio.

FIG. 5 illustrates an exemplary plot of the 1st order fundamental signal power and 2nd order harmonic signal power and their power ratio as a function of an MZM's DC bias phase angle. In one embodiment, a dither tone at 1 KHz at 1V peak-peak for an MZM with $V_\pi$ at 4V may be used. It will be understood that $V_\pi$ may be predetermined for a given MZM. The line depicting a series of squares may represent a 1st order fundamental signal. The line depicting a series of triangles may represent a 2nd order harmonic signal. The solid lines may represent the ratio of the 2nd order harmonic signal to the 1st order harmonic signal as the DC phase bias angle varies. As illustrated, the ratio may vary monotonically with well defined behavior. The ratio may also be sensitive to phase angle change which may meet the criterion of a reliable feedback parameter. The shift from positive to negative relative power (or vice versa), shown in the plots reflect phase changes for 1st order and 2nd order output signals with respect to input dither tone, which can be used to set the MZM biasing slope (either positive or negative). The ratio may be first calibrated at a positive sloped quadrature point then input into a microcontroller. The calibration can be bypassed if the $V_\pi$ and dither amplitude are both known.

Figure 6:
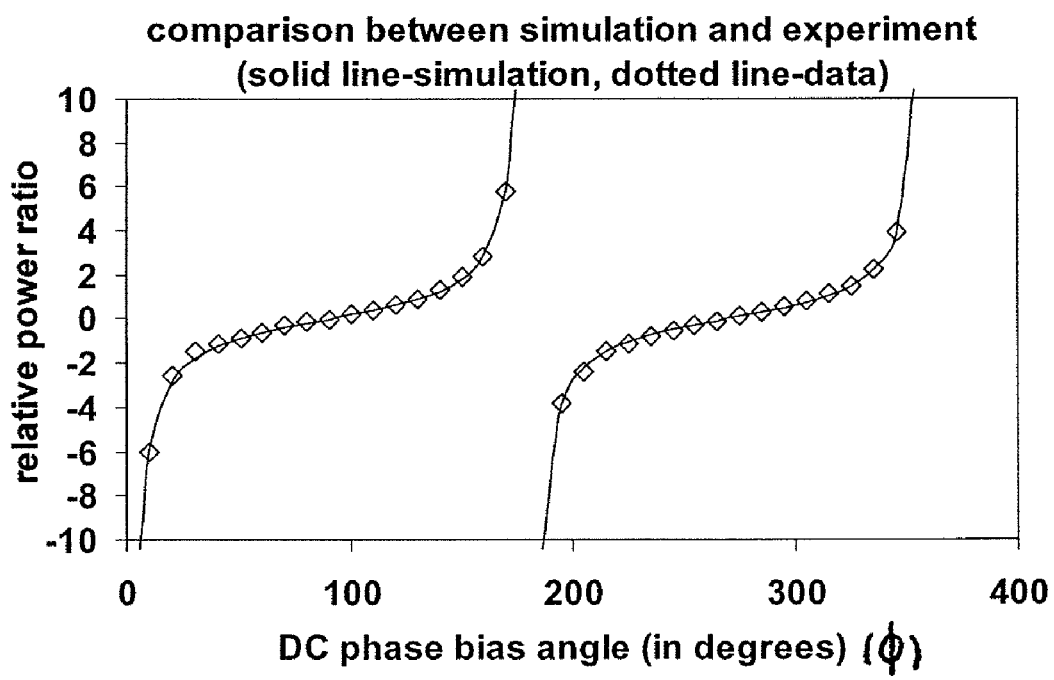
FIG. 6 is an example of a graph illustrating predicted performance compared to measured performance of an optical modulator.

FIG. 6 depicts an exemplary plot comparing experiment data and simulation data of relative power ratios of the 2nd order harmonic signal to 1st order fundamental signal as a function of DC bias phase positions. The solid lines may represent expected simulation data while the diamond-shaped points may represent measured experimental data. As one may appreciate, there appears to be a substantial agreement between the experimental data and the simulated data.

Figure 7:
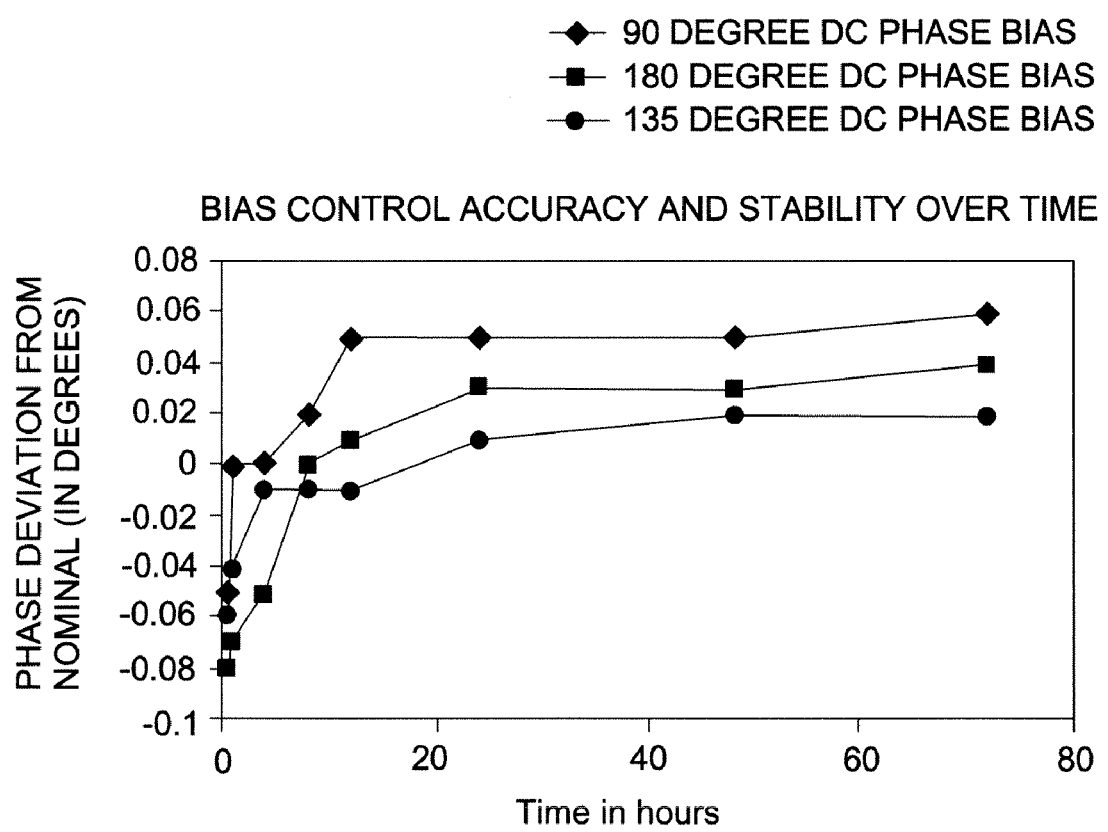
FIG. 7 is an example of a graph illustrating bias control accuracy over time.

FIG. 7 depicts a plot illustrating the biasing stability of an MZM operating at three different phase angles as a function of time. The diamond-shaped series may represent phase deviation over time at a 90 degree DC phase bias. The square-shaped series may represent phase deviation over time at a 180 degree DC phase bias. The circular-shaped series may represent phase deviation over time at a 135 degree DC phase bias. As may be appreciated, stability of the MZM under exemplary operations of the subject technology may demonstrate consistent stability at various bias phase positions.

In one aspect, it may be appreciated that embodiments disclosed herein employing the ratio between the 2nd order harmonic signal and 1st order fundamental signal of a modulated optical signal may achieve reliable locking at any phase bias point along an MZM transfer function curve and may further be rigorously independent of optical input power.

Figure 8:
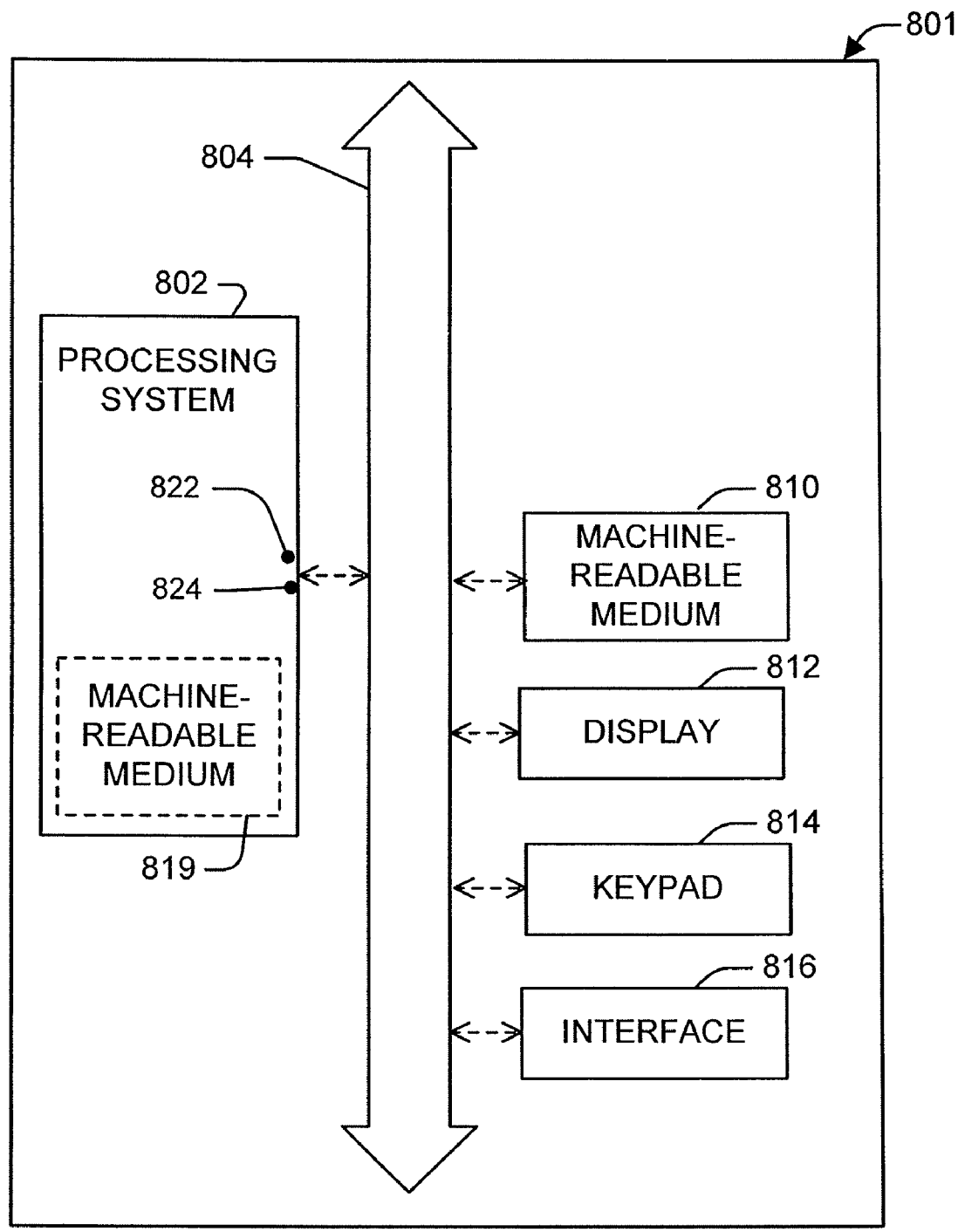
FIG. 8 is an example of a processing system that may be employed in the apparatus of FIG. 1.

FIG. 8 is a conceptual block diagram illustrating an example of a system. A system 801 may be, for example, a microcontroller 170 in FIG. 2. The system 801 includes a processing system 802. The processing system 802 is capable of communication with various components (e.g., 810, 812, 814, 816) through a bus 804 or with other structures or devices. It should be understood that communication means other than busses can be utilized with the disclosed configurations.

The processing system 802 may include a general-purpose processor or a specific-purpose processor for executing instructions and may further include a machine-readable medium 819, such as a volatile or non-volatile memory, for storing data and/or instructions for software programs. The instructions, which may be stored in a machine-readable medium 810 and/or 819, may be executed by the processing system 802 to control and manage access to the various networks, as well as provide other communication and processing functions. The instructions may also include instructions executed by the processing system 802 for various user interface devices, such as a display 812 and a keypad 814. The processing system 802 may include an input port 822 and an output port 824. Each of the input port 822 and the output port 824 may include one or more ports. The input port 822 and the output port 824 may be the same port (e.g., a bi-directional port) or may be different ports.

The processing system 802 may be implemented using software, hardware, or a combination of both. By way of example, the processing system 802 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable device that can perform calculations or other manipulations of information.

A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 819) may include storage integrated into a processing system, such as might be the case with an ASIC. Machine-readable media (e.g., 810) may also include storage external to a processing system, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system 802. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. In one aspect, a machine-readable medium is a machine-readable storage medium or a computer-readable storage medium. Instructions can be, for example, a computer program including code.

An interface 816 may be any type of interface and may reside between any of the components shown in FIG. 8. An interface 816 may also be, for example, an interface to one or more external devices (e.g., a ratio divider 183, a DC bias supply 155, or an Internet network interface). An interface 816 may be used to receive and/or transmit information. A functionality implemented in a processing system 802 may be implemented in a portion of a machine-readable medium 810, a portion of a display 812, a portion of a keypad 814, or a portion of an interface 816, and vice versa.

While the previous description has been described in terms of a feedback signal based on a ratio of a 1st order fundamental signal and a 2nd order harmonic signal, another aspect of the subject disclosure may be described as using a ratio of an odd order harmonic signal and an even order harmonic signal. A ratio of an odd order harmonic signal and an even order harmonic signal may include the use of a 1st order fundamental signal and a 2nd order harmonic signal as well as the use of other harmonic signals. For example, an even order harmonic signal may be one or more of the following: a 2nd order harmonic signal, a 4th order harmonic signal, a 6th order harmonic signal, or an n order harmonic signal where n represents an even number. An odd order harmonic signal may be one or more of the following: a 1st order fundamental signal, a 3rd order harmonic signal, a 5th order harmonic signal, or an n+1 order harmonic signal. A ratio may be determined, for example, from a 1st order fundamental signal used in conjunction with a 4th order harmonic signal. As another example, a 2nd order harmonic signal may be used in conjunction with a 3rd order harmonic signal to produce a ratio for the feedback signal. As another example, a ratio may be determined from a 3rd order harmonic signal and a 4th order harmonic signal. The 1st order filter 180 and the 2nd order filter 185 may each be attuned to provide the desired odd order harmonic signal and the desired even order harmonic signal.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An optical modulation apparatus, comprising:
   an optical modulator operable to modulate an optical signal;
   a photodetector disposed to receive at least a portion of the modulated optical signal; and
   a bias controller coupled to both the optical modulator and the photodetector, the bias controller configured to receive a dither signal and to produce a bias feedback signal for the optical modulator, the bias feedback signal based on a ratio between an odd order harmonic signal of the modulated optical signal and an even order harmonic signal of the modulated optical signal.

2. The optical modulation apparatus of claim 1, wherein the odd order harmonic signal is based on a frequency of the dither signal.

3. The optical modulation apparatus of claim 1, wherein the odd order harmonic signal and the even order harmonic signal are based on a frequency of the dither signal, wherein the dither signal comprises an alternating current (AC) signal, and wherein the ratio is independent of an input optical signal power.

4. The optical modulation apparatus of claim 1, wherein the bias controller comprises a direct current (DC) bias supply configured to receive the dither signal, to receive a control signal based on the ratio, and to supply the bias feedback signal to the optical modulator.

5. The optical modulation apparatus of claim 1, wherein the bias controller includes one or more filters configured to produce the odd order harmonic signal and the even order harmonic signal.

6. The optical modulation apparatus of claim 1, wherein the bias feedback signal adjusts an operating bias point of the optical modulator, a desired operating bias point is an arbitrary point, the dither signal has a first frequency, the optical modulator is operable to modulate the optical signal with a radio frequency (RF) signal having a second frequency, the dither signal and the RF signal are different, and the second frequency is more than twenty times the first frequency.

7. The optical modulation apparatus of claim 1, wherein the bias feedback signal includes a bias control adjustment value based on a comparison of the ratio between the odd order harmonic signal and the even order harmonic signal and a stored bias point ratio value.

8. A bias controller apparatus for an optical modulator, comprising:
    a filter module configured to receive an electrical signal of a modulated optical signal from an optical modulator, the filter module configured to produce a 1st order fundamental signal of the modulated optical signal, the filter module configured to produce a 2nd order harmonic signal of the modulated optical signal;
    a controller module configured to produce a ratio based on the 1st order fundamental signal and the 2nd order harmonic signal, the controller module configured to compare the ratio to a predetermined ratio, the controller module configured to produce a bias control value based on the comparison of the ratio and the predetermined ratio; and
    a bias supply module configured to receive a dither signal and the bias control value and to produce a bias signal for the optical modulator based on the dither signal and the bias control value.

9. The bias controller apparatus of claim 8, wherein the filter module comprises a first filter and a second filter, the first filter configured to produce the 1st order fundamental signal, the second filter configured to produce the 2nd order harmonic signal,
    wherein the controller module comprises a ratio divider and a microcontroller, the ratio divider configured to produce the ratio, the microcontroller configured to compare the ratio to the predetermined ratio and to produce the bias control value,
    wherein the bias supply module comprises a DC bias supply configured to produce the bias signal, and
    wherein the bias controller further comprises:
        a switch coupled to the first filter and the second filter, the switch configured to direct the electrical signal to the first filter and/or the second filter; and
        a dither signal generator coupled to the DC bias supply, the dither signal generator configured to produce the dither signal.

10. The bias controller apparatus of claim 8, wherein the filter module comprises a first filter and a second filter in parallel, the first filter configured to produce the 1st order fundamental signal, the second filter configured to produce the 2nd order harmonic signal.

11. The bias controller apparatus of claim 8, wherein the ratio is based on a frequency of a dither signal and a bias signal for the optical modulator, and
    wherein the predetermined ratio is a ratio between a prior 1st order fundamental signal of a prior modulated optical signal and a prior 2nd order harmonic signal of the prior modulated optical signal, the predetermined ratio determined based on a prior dither signal received at a first time period and based on a prior bias signal supplied to the optical modulator at the first time period, the prior bias signal for producing an output power of the optical modulator at an arbitrary bias point along a transfer function curve associated with operation of the optical modulator.

12. The bias controller apparatus of claim 8, wherein a frequency of the 1st order fundamental signal is substantially the same as a frequency of the dither signal.

13. The bias controller apparatus of claim 8, wherein the predetermined ratio is based on a bias point along a transfer function curve associated with operation of the optical modulator, wherein the bias point is not any of the following: a peak point, a null point, or a quadrature point along the transfer function curve.

14. The bias controller apparatus of claim 8, wherein the controller module comprises a ratio divider and a microcontroller, the ratio divider configured to produce the ratio, the microcontroller configured to compare the ratio to the predetermined ratio and to produce the bias control value.

15. A method of controlling a bias of an optical modulator, comprising:
    receiving an electrical signal converted from a modulated optical signal of an optical modulator, the modulated optical signal based on a bias signal with a dither signal;
    providing an odd order harmonic signal of the modulated optical signal;
    providing an even order harmonic signal of the modulated optical signal;
    producing a ratio of the odd order harmonic signal and the even order harmonic signal;
    comparing the ratio to a predetermined ratio;
    producing a bias control value based on the comparison of the ratio and the predetermined ratio; and
    producing a second bias signal for the optical modulator based on the bias control value.

16. The method of claim 15, further comprising:
    filtering the electrical signal to produce the odd order harmonic signal of the modulated optical signal; and
    filtering the electrical signal to produce the even order harmonic signal of the modulated optical signal.

17. The method of claim 15, further comprising:
    directing the electrical signal to a first bandpass filter to produce the odd order harmonic signal; and
    directing the electrical signal to a second bandpass filter to produce the even order harmonic signal.

18. The method of claim 15, wherein the odd order harmonic signal and the even order harmonic signal are a 1st order fundamental signal and a 2nd order harmonic signal respectively and are based on a frequency of the dither signal.

19. The method of claim 15, further comprising:
    receiving a first bias signal with a first dither signal;
    receiving a first optical signal;
    modulating the first optical signal to produce a first modulated optical signal;
    determining whether the first modulated optical signal is at a desired level;

converting the first modulated optical signal to a first electrical signal;
providing a first odd order harmonic signal of the first modulated optical signal;
providing a first even order harmonic signal of the first modulated optical signal;
producing the predetermined ratio of the first odd order harmonic signal and the first even order harmonic signal; and
storing the predetermined ratio.

20. The method of claim 15, further comprising:
receiving the bias signal with the dither signal;
receiving an optical signal;
modulating the optical signal to produce the modulated optical signal;
converting the modulated optical signal to the electrical signal; and
providing the second bias signal to the optical modulator to adjust an operating bias point of the optical modulator,
wherein the odd order harmonic signal and the even order harmonic signal are based on a frequency of the dither signal, and
wherein the operating bias point is not any of the following: a peak point, a null point, or a quadrature point along a transfer function curve associated with operation of the optical modulator.

* * * * *